United States Patent [19]

Oliver et al.

[11] Patent Number: 5,780,956
[45] Date of Patent: Jul. 14, 1998

[54] ROTARY PIEZOELECTRIC MOTOR FOR VEHICLE APPLICATIONS

[75] Inventors: John R. Oliver, Newbury Park; Ramakar R. Neurgaonkar; Jeffrey G. Nelson, both of Thousand Oaks, all of Calif.; Carlo Bertolini, Feucherolles, France

[73] Assignee: Meritor Light Vehicle Systems, Inc., Troy, Mich.

[21] Appl. No.: 747,140

[22] Filed: Nov. 12, 1996

[51] Int. Cl.⁶ .................... H02N 2/00; H01L 41/08
[52] U.S. Cl. ............................... 310/323; 310/328
[58] Field of Search ......................... 310/328, 323

[56] References Cited

U.S. PATENT DOCUMENTS

| | | | |
|---|---|---|---|
| 4,714,855 | 12/1987 | Fujimoto | 310/328 |
| 5,068,566 | 11/1991 | Culp | 310/328 |
| 5,270,984 | 12/1993 | Mine | 310/328 |
| 5,314,175 | 5/1994 | Izumi et al. | 310/328 |
| 5,410,206 | 4/1995 | Leucke et al. | 310/328 |
| 5,465,021 | 11/1995 | Visscher et al. | 310/328 |
| 5,640,063 | 6/1997 | Zumeris et al. | 310/328 |

FOREIGN PATENT DOCUMENTS 61-150287  7/1986  Japan .................. 310/328

*Primary Examiner*—Thomas M. Dougherty

[57] ABSTRACT

A piezoelectric drive to provide a rotary force to a rotating element includes a pair of circumferentially spaced fingers. The fingers are selectively moved towards and away from the rotating element with piezoelectric actuators that expand and contract. An intermediate piezoelectric actuator moves the two fingers away from each other or allows them to be moved towards each other. A bias force acts in opposition to the intermediate piezoelectric actuator. By controlling the three piezoelectric actuators, the system rotates the rotating element. The system is preferably utilized for driving a vehicle component, and most preferably, a window for a vehicle. The inventive motor provides a low cost compact motor for driving vehicle components.

19 Claims, 2 Drawing Sheets

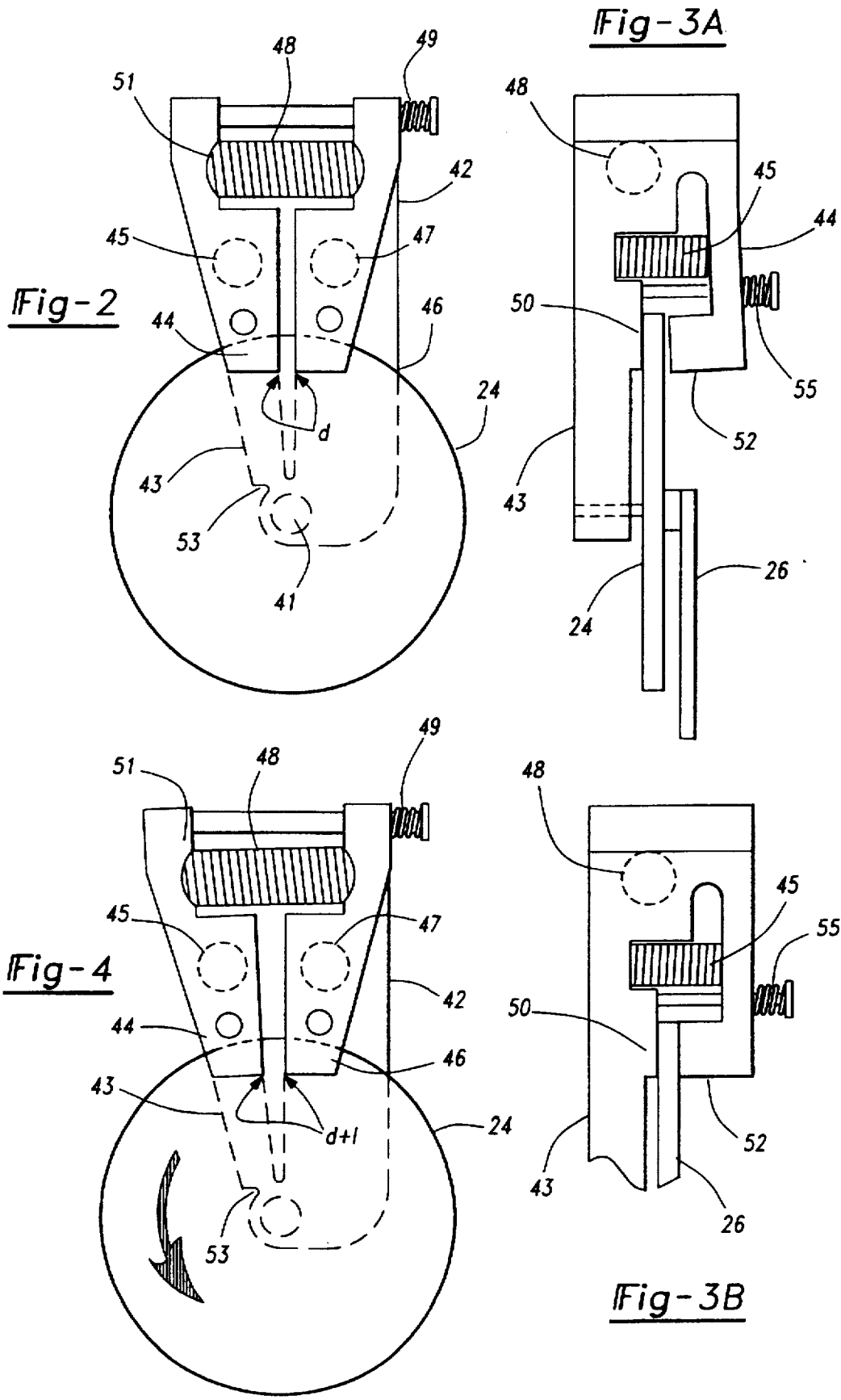

ROTARY PIEZOELECTRIC MOTOR FOR VEHICLE APPLICATIONS

BACKGROUND OF THE INVENTION

This invention relates to a rotary piezoelectric motor. The motor has particular application for driving vehicle components.

Piezoelectric actuators are utilized in many applications to provide a motive force to drive transmission elements. Piezoelectric elements are generally formed of specific materials that expand or contract in response to an applied voltage. One particularly valuable type of piezoelectric actuator contain a plurality layers that can expand and contract quite rapidly. By controlling expansion and contraction, the piezoelectric actuators have beneficial motor characteristics.

Vehicle components have typically utilized rotary or linear electric motors to drive components. Examples of the type of vehicle components routinely driven by electric motors are window lifts, sunroof lifts, door lock mechanisms, seat position drives, and many other moving elements. The electric motors typically utilized for vehicle applications have been somewhat bulky and expensive.

Piezoelectric actuators are relatively small compared to electric motors. In addition, they can be relatively inexpensive. However, piezoelectric actuators have not been utilized to drive vehicle components in the past. The known piezoelectric motors have typically not transmitted the torque that would be required for vehicle applications.

SUMMARY OF THE INVENTION

In a disclosed embodiment of this invention, piezoelectric actuators are utilized to provide a rotary motor for driving a vehicle component. In preferred embodiments, the rotating element is utilized to drive a window. Even though the disclosed embodiment drives a window, it should be understood that the inventive motor can be utilized to drive other vehicle components such as sunroofs, door locks, mirrors, etc.

In a preferred embodiment of this invention, the piezoelectric motor comprises two spaced fingers each being moveable toward and away from a rotating element under the influence of a piezoelectric actuator. Each finger is associated with a separate piezoelectric actuator that can expand to move the finger away from the rotating element, or contract to move the finger toward the rotating element. A central piezoelectric actuator expands to force the two fingers away from each other, and a bias force draws the two fingers back together.

In a preferred method of this invention, a first of the fingers has its piezoelectric actuator de-energized to clamp the finger on the rotating element. The second finger is released. The intermediate piezoelectric actuator then forces the two fingers away from each other. As the first finger is forced away from the second, it drives the rotating member through a fixed distance. Once the rotating member has moved the fixed distance, the second finger is clamped, and the first finger is released. The intermediate piezoelectric actuator is contracted, or relaxed. The bias force then draws the two fingers together. The bias force can be provided by a separate spring. Alternatively, a solid part may comprise both finger elements and a memory force can pull them back together.

By rapidly repeating this movement, the inventive transmission is able to provide smooth rotation to the rotating element. The rotary transmission element in turn is associated with a drive for a window lift, or other vehicle component. In one embodiment, the rotary transmission element rotates a lever which is connected to a series of linkages that moves a window upwardly or downwardly. In an alternative embodiment, the rotary transmission element drives a cable to raise and lower the window lift.

These and other features of the present invention will be best understood from the following specification and drawings, of which the following is a brief description.

BRIEF DESCRIPTION OF THE DRAWINGS

FIG. 2 shows a detail of the motor of the present invention.

FIG. 3A shows the motor in an unclamped position.

FIG. 3B shows the motor in a clamped position.

FIG. 4 shows movement from the position shown in FIG. 2.

DETAILED DESCRIPTION OF PREFERRED EMBODIMENTS

Figure 1:
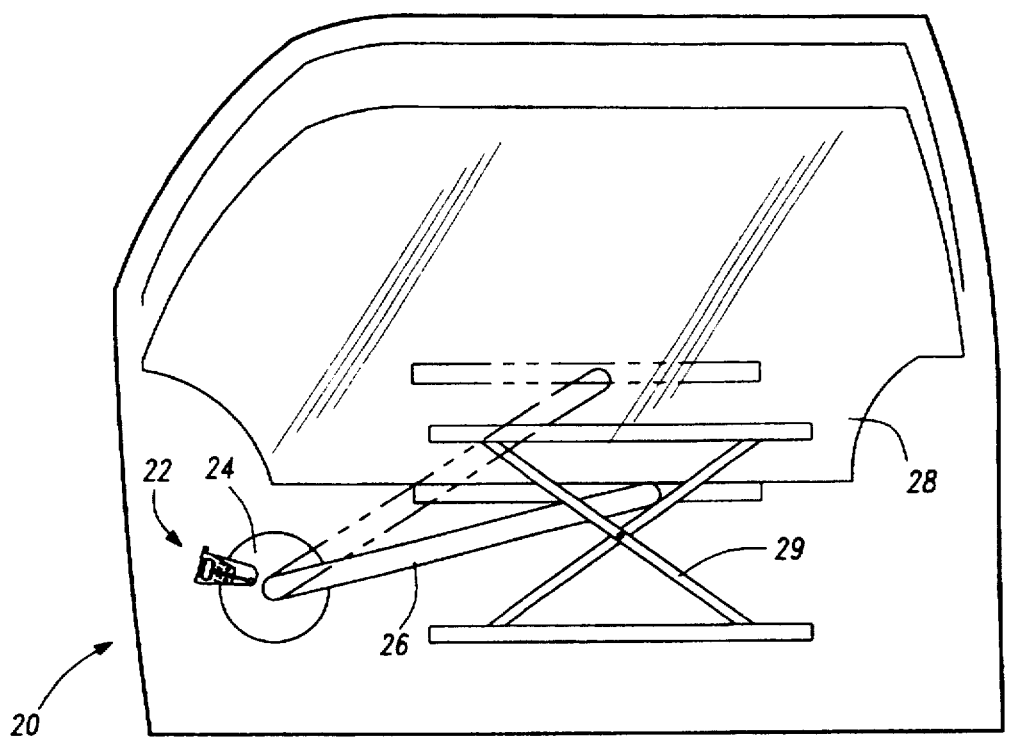
FIG. 1 is a simplified view of a window drive.

A transmission 20 illustrated in FIG. 1A includes a piezoelectric motor 22 for driving a rotating transmission element 24. The rotating element 24 is fixed to rotate with a linkage 26 which is in turn connected to a window 28 through a series of linkages 29, shown schematically. Linkage 26 only need rotate through a limited angular extent to raise and lower the window. As is known, when linkage 26 rotates the other links slide and pivot to guide and drive window 28 upwardly or downwardly. The exact linkage may be as known, and forms no portion of this invention.

As shown in FIG. 2, motor 22 includes a bottom base 42 fixed to a frame which holds a shaft 41 for rotating element 24. Connected to the base 42 is a movable arm 43. A pair of spaced fingers 44 and 46 extend from frame 42 and arm 43 towards the rotating element 24. Piezoelectric actuators 45 and 47 are associated with fingers 44 and 46. Piezoelectric elements 45 and 47 are preferably stack actuators which may expand or contract in response to electric signals. Such piezoelectric actuators are known in the art; it is the arrangement and function of the element that are the inventive aspects in this application. An intermediate piezoelectric actuator 48 is positioned in a pocket 51 between fingers 44 and 46. A spring 49 may bias fingers 44 and 46 together. A notch 53 assists in allowing arm 43 to rotate away from base 42 when actuator 48 expands.

As shown in FIG. 3A, finger 44 is attached to arm 43. It should be understood that finger 46 and base 42 have a similar structure. The finger 44 consists of a fixed portion 50 positioned beneath the rotating element 24 and an upper portion 52 positioned above the rotating element 24. In the unclamped position shown in FIG. 3A, the piezoelectric element 45 is expanded. Finger portion 52 is spaced away from the rotating element 24. Portion 50 may be fixed, or can also be movable toward and away element 24. A spring 55 biases portion 52 toward rotating element 24. As shown in FIG. 3B, the piezoelectric element 45 has moved to a relaxed or contracted position, and portion 52 is biased back downwardly. The bias force may be supplied by a spring 55, or from a memory in the material. Now, finger portions 50 and 52 squeeze rotating element 24.

FIGS. 4 shows the basic operation of the inventive transmission 22. As shown in FIG. 4, the fingers 44 and 46 are spaced circumferentially on rotating element 24. Spring 49 biases the fingers 44 and 46 towards each other. Although spring 49 is shown as a separate element in this drawing, the spring function could be provided by memory within the material that forms the base 42 and arm 43.

As shown in FIG. 2, fingers 44 and 46 are initially spaced by a distance d. In a first step, finger 44 is locked to the transmission element 24, or is in the position shown in FIG. 3B. The finger 46 is unclamped, on the relaxed position or the position shown in FIG. 3A. The intermediate piezoelectric actuator 48 is then moved to its expanded position as shown in FIG. 4. Finger 44 is then forced away from finger 46, and drives rotating element 24 about its axis of rotation. Now, as shown in FIG. 4, the fingers 44 and 46 are spaced by a distance d+1. It should be understood that arm 43 and notch 53 assist in the relative movement of finger 44 and finger 46. Note that arm 43 maintains the radial alignment of finger 44 during rotation of element 24. The amount of movement 1 is exaggerated to show the fact of the movement. In fact, the movement may be relatively small, and the actuators may be controlled very rapidly. The components of the motor 22, other than the unclamped finger 46, are either fixed to the frame base 42 or tightly clamped on the rotating element 24. Thus, when the force of the expansion of actuator 48 occurs, the clamped finger 44 will move from the unclamped finger 46, and cause the rotation of the rotating element 24.

In a second step, finger 46 is moved to the clamped position as shown in FIG. 3B. Then, finger 46 is moved to the relaxed or unclamped position as shown in FIG. 3A by energizing actuator 45. Intermediate piezoelectric actuator 48 is moved to its contracted or relaxed position. The spring bias 49 then pulls finger 44 rapidly back towards finger 46. After this movement, the fingers 44 and 46 are again in the FIG. 2 position, spaced by a distance d. However, the rotating element has been rotated by a distance 1.

Reverse rotation can be achieved by reversing the above-described steps. To reverse operation, the steps are performed in the reverse manner, with the finger 44 being locked and finger 46 being unlocked in combination with the contraction of the intermediate piezoelectric actuator 48. In this case, the torque on the rotating element 24 is provided by the spring 49, rather than by the actuator 48.

Figure 5:
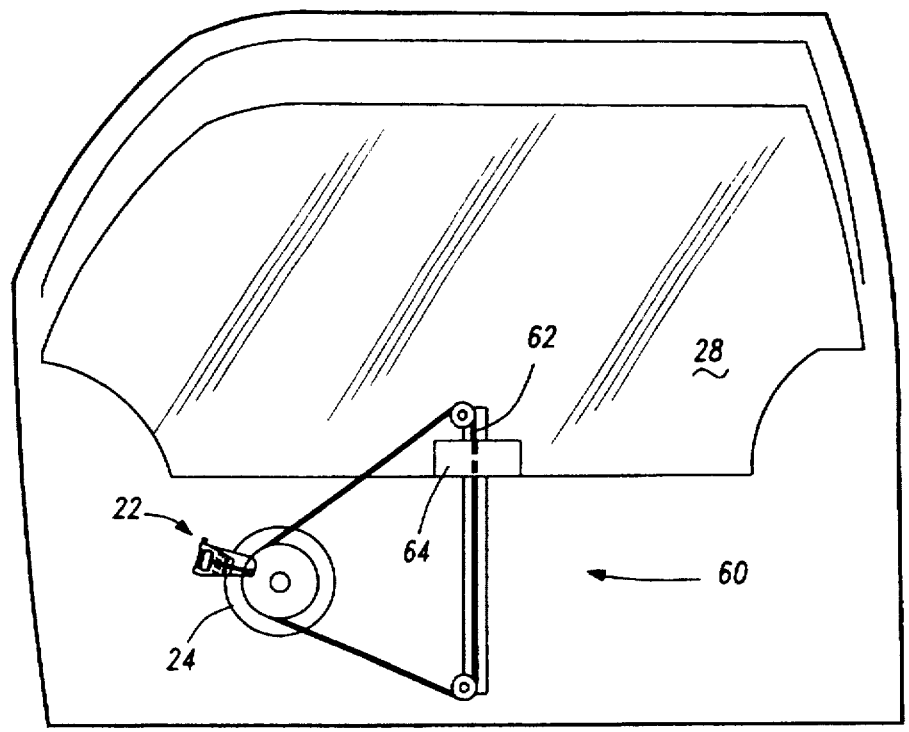
FIG. 5 shows a second embodiment.

FIG. 5 shows another embodiment 60 wherein the rotating element 24 drives a cable 62 which is fixed to a block 64 to raise or lower a window 28.

Controls for this invention allow very rapid cycling of the system such that very smooth and quick movement of the rotating element 24 is achieved.

By quickly repeating the two main steps, motor 22 is able to incrementally and smoothly rotate the rotating element. By controlling the operation of the piezoelectric actuators 45, 47 and 48, the overall movement of the rotating element is very smooth, and effectively continuous.

The force capability of the motor is determined by the frictional force of the clamping fingers 44 and 46, and by the force capability and mechanical stiffness of the piezoelectric actuator 48. Motor torque is also proportioned to the diameter of the rotating element 24. Motor speed is governed by the operating frequency and the amount of motion achieved on each cycle. Motor torque is also inversely proportional to the diameter of the rotating element 24. Note that both fingers 44 and 46 are clamped to the rotating element 24 when the motor is off, so that the motor is effectively locked in position when off.

Preferred embodiments of this invention have been disclosed, however, a worker of ordinary skill in the art would recognize that certain modifications would come within the scope of this invention. For that reason, the following claims should be studied to determine the true scope and content of this invention.

We claim:

1. A vehicle component and drive comprising:

a vehicle component;

a rotating element for moving said vehicle component;

a piezoelectric drive system for rotating said rotating element, said drive system includes a pair of fingers spaced circumferentially about said rotating element, expanding and contracting piezoelectric actuators being associated with each of said fingers such that said fingers may be selectively brought into clamping contact with said rotating element, or moved to a position spaced from said rotating element.

2. A system as recited in claim 1, wherein said vehicle component is a vehicle window.

3. A system as recited in claim 2, wherein said rotating element is connected to said window by a series of linkages.

4. A system as recited in claim 2, wherein said rotating element is connected to said window by a cable.

5. A system as recited in claim 1, wherein each of said fingers include portions spaced on opposed sides of said rotating element.

6. A system as recited in claim 5, wherein one of said portions is fixed, and the other of said portions moves towards and away from said rotating element to clamp said finger on said rotating element.

7. or A system as recited in claim 1, wherein an intermediate piezoelectric actuator is positioned between said fingers to move said fingers away from each other.

8. A system as recited in claim 7, wherein a bias force biases said fingers back towards each other in opposition to said intermediate piezoelectric actuator.

9. A piezoelectric drive for creating a rotary force comprising:

a motor body including a base to be fixed to a frame for supporting said motor and a movable arm attached to said base;

a pair of fingers, one associated with said base and one with said arm, which are spaced relative to each other;

piezoelectric actuators associated with each of said fingers to move said fingers toward and away from a surface adjacent to said fingers; and a drive to move said fingers away from each other.

10. A drive as recited in claim 9, wherein each of said fingers include two opposed portions defining a space with said surface being received within said space.

11. A drive as recited in claim 10, wherein one of said opposed portions is fixed and the other of said opposed portions is movable toward and away from said surface under the influence of one of said piezoelectric actuators.

12. A drive as recited in claim 11, wherein said pair of fingers are biased toward each other.

13. A drive as recited in claim 12, wherein said bias is created by a separate spring element.

14. A drive as recited in claim 9, wherein said drive is an intermediate piezoelectric actuator which selectively moves said fingers away from each other.

15. A drive as recited in claim 14, wherein a bias force urges said fingers toward each other in opposition to said intermediate piezoelectric actuator.

16. A drive as recited in claims 15, wherein said bias force is provided by a spring element.

17. A drive as recited in claim 15, wherein said bias force is provided by a memory in the material forming said arm and said base.

18. A method of providing a rotary force to a rotating element comprising the steps of:

(1) providing a rotating element for driving a component, providing a piezoelectric motor for providing a rotary force to said rotating element, said piezoelectric element including two fingers spaced circumferentially relative to said rotating element, each of said fingers being provided with a piezoelectric actuator for moving said finger towards and away from said rotating element, and an intermediate piezoelectric actuator being positioned between said fingers to move said fingers towards and away from each other;

(2) moving a first of said fingers toward said rotating element to lock said finger on said rotating element and moving a second of said fingers away from said rotating element, driving said first finger away from said second finger with said intermediate piezoelectric actuator, thus driving said rotating element about an axis of rotation;

(3) moving said first finger away from said rotating element, moving said second finger to a position where it is locked to said rotating element, relaxing said intermediate piezoelectric actuator, and moving said first finger towards said second finger with a bias force; and (4) repeating steps (2) and (3).

19. A method as recited in claim 18, wherein said rotating element is connected to drive a vehicle component.

* * * * *